United States Patent
An (10) Patent No.: US 10,272,854 B2
(45) Date of Patent: Apr. 30, 2019

(54) CONSOLE ASSEMBLIES WITH LID ASSEMBLY DAMPING FEATURES

(71) Applicant: Toyota Motor Engineering & Manufacturing North America, Inc., Erlanger, KY (US)

(72) Inventor: Chae An, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/657,757

(22) Filed: Jul. 24, 2017

(65) Prior Publication Data

US 2019/0023196 A1    Jan. 24, 2019

(51) Int. Cl.
*B60R 7/04*     (2006.01)
*B60R 13/08*    (2006.01)
*E05F 5/06*     (2006.01)
*B60R 11/00*    (2006.01)

(52) U.S. Cl.
CPC ............. *B60R 13/08* (2013.01); *B60R 7/04* (2013.01); *E05F 5/06* (2013.01); *B60R 2011/0007* (2013.01); *E05Y 2900/538* (2013.01)

(58) Field of Classification Search
CPC ... B60R 13/08; B60R 7/04; B60R 2011/0007; E05F 5/06; E05Y 2900/538
USPC ............................................. 296/24.34, 37.8
See application file for complete search history.

(56) References Cited

U.S. PATENT DOCUMENTS

| | | | |
|---|---|---|---|
| 2007/0138819 A1* | 6/2007 | Akimoto | B60N 2/793 296/37.8 |
| 2009/0224565 A1* | 9/2009 | Hamaguchi | B60R 7/06 296/37.12 |
| 2013/0062899 A1* | 3/2013 | Stoia | B60N 2/773 296/24.34 |
| 2014/0190841 A1 | 7/2014 | Nash | |
| 2015/0035308 A1* | 2/2015 | Huebner | B60R 7/04 296/37.8 |
| 2017/0015250 A1* | 1/2017 | Neumann | B60N 3/10 |
| 2017/0101815 A1* | 4/2017 | Mcroskey | E05F 5/06 |

FOREIGN PATENT DOCUMENTS

| | | |
|---|---|---|
| CN | 201494372 U | 6/2010 |
| CN | 204527036 U | 8/2015 |
| DE | 10200605 A1 | 4/2008 |
| EP | 1403132 A2 | 11/2007 |

OTHER PUBLICATIONS http://f80.bimmerpost.com/forums/showthread.php?t=1031768, 5—Rear center console trim, 28 pages.
http://f80.bimmerpost.com/forums/showthread.php?t=1031768; Troubleshooting noise from the steering column (up-down or inout adjustment), 14 pages.

* cited by examiner

*Primary Examiner* — Gregory A Blankenship
(74) *Attorney, Agent, or Firm* — Dinsmore & Shohl LLP (57) ABSTRACT

An automobile console assembly comprising a center console housing, a lid assembly that mechanically interfaces with the console housing. The lid assembly is moveable relative to the console housing between an open configuration and a closed configuration. An adhesive buffer strip passes between the console housing and the lid assembly with the lid assembly in the closed configuration.

20 Claims, 7 Drawing Sheets

CONSOLE ASSEMBLIES WITH LID ASSEMBLY DAMPING FEATURES

TECHNICAL FIELD

The present specification generally relates to center console assemblies and, more specifically, center console assemblies that include lid assembly damping features.

BACKGROUND

Innumerable surfaces are in contact within the confines of an automobile. The interaction or contact between certain surfaces within the vehicle may produce vibration or noise. Excessive vibration may lead to the degradation of equipment and/or noise that may get worse as the equipment and fittings or seals degrade. Operators of vehicles may seek solutions to prevent such noise and/or degradation.

One potential solution to unwanted vibration is the use of rubber stoppers, which can absorb forces that may cause vibration. For example, lid assembly assemblies for center console assemblies may include a rubber bumper to inhibit vibration of the lid assembly assemblies during operation of a vehicle. However, additional features may be required to further dissipate vibration or noise.

Accordingly, other damping features for limiting the vibration of center console assemblies are desired.

SUMMARY

In one embodiment, an automobile console assembly includes a center console housing. A lid assembly mechanically interfaces with the console housing. The lid assembly is moveable relative to the console housing between an open configuration and a closed configuration. An adhesive buffer strip passes between the console housing and the lid assembly with the lid assembly in the closed configuration.

In another embodiment, a vehicle having a console assembly includes a center console housing. A lid assembly mechanically interfaces with the console housing. The lid assembly is moveable relative to the console housing between an open configuration and a closed configuration. An adhesive buffer strip passes between the console housing and the lid assembly with the lid assembly in the closed configuration.

In yet another embodiment, a method of preventing an adhesive buffer strip that forms a mechanical interface between a lid assembly and a console housing from peeling away from a base component of the lid assembly is provided. The method includes providing an adhesive buffer strip having an adhesive side and an external-contact side and a first end and a second end. The buffer strip has a sufficient length to loop around a portion of the base component of the lid assembly. The buffer strip is looped around the portion of the base component such that the adhesive side contacts and adheres to the portion of the base component, thereby anchoring the buffer strip to the base component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a passenger compartment having an instrument panel and at least two seats, a driver seat and a front passenger seat. Between the driver seat and the passenger seat and rearward of the instrument panel is a console assembly. The console assembly extends rearward from the instrument panel in a vehicle longitudinal direction. The console assembly may be mounted in-between the driver seat and the front passenger seat, and immediately rearward of the instrument panel so that a portion the console assembly may be incorporated with the instrument panel.

The console assembly may include a storage compartment. The storage compartment may include a console housing that has a floor, a pair of sidewalls, and a pair of end walls so as to define a storage area. The housing includes an opening permitting access to the storage area. Further, the storage compartment may be pivotally coupled a lid assembly. The lid assembly may be pivotally connected to the console assembly at the rear wall of the pair of end walls at a hinged connection.

The lid assembly may include a lid cover component and a lid base component having an underhang surface and a lid opening recess that extends through the lid cover component, the lid base component and the underhang surface of the lid base component. The lid base component may also include a passage opening adjacent to the lid opening recess that passes through the underhang surface of the lid base component. The lid opening recess may be defined by a lower wall portion forming a perimeter of the lid opening recess in the lid base component and an upper wall portion forming a perimeter of the lid opening recess in the lid cover component. An indent may pass between an upper portion of the lower wall portion and the lid cover component such that a buffer strip can pass through an opening formed by the indent, along an interior surface of the lower wall portion, through the passage opening, around the underhang surface of the lid base component and back up along an exterior surface of the lower wall portion, thus looping around the lower wall portion.

The console assembly may include the buffer strip for buffering the contact between the lid assembly and the console assembly. The buffer strip may reduce vibration between the lid assembly and the console housing by forming a mechanical interface between the lid assembly and the console housing and absorbing the motion and vibration. Various embodiments of the console assembly will be described in greater detail herein.

It should be appreciated that the console assembly may be provided at any suitable position within a vehicle, such as between a pair of front row seats, a pair of second or third row rear seats, etc. No matter where the console assembly is within the vehicle, the console assembly may be provided with an interior cavity utilized as a storage compartment. The console assembly is typically provided within a center console of a vehicle as described above. While the embodiments described herein are described in reference to a console assembly having an interior cavity used as a storage area, the embodiments are not limited thereto. For example, in some embodiments, the storage area of the console assembly may include, without limitation, alternative vehicle accessories such as receptacles (e.g., a cup holder), ashtrays, electronic components, HVAC, and/or audio component controls, etc.

Figure 1:
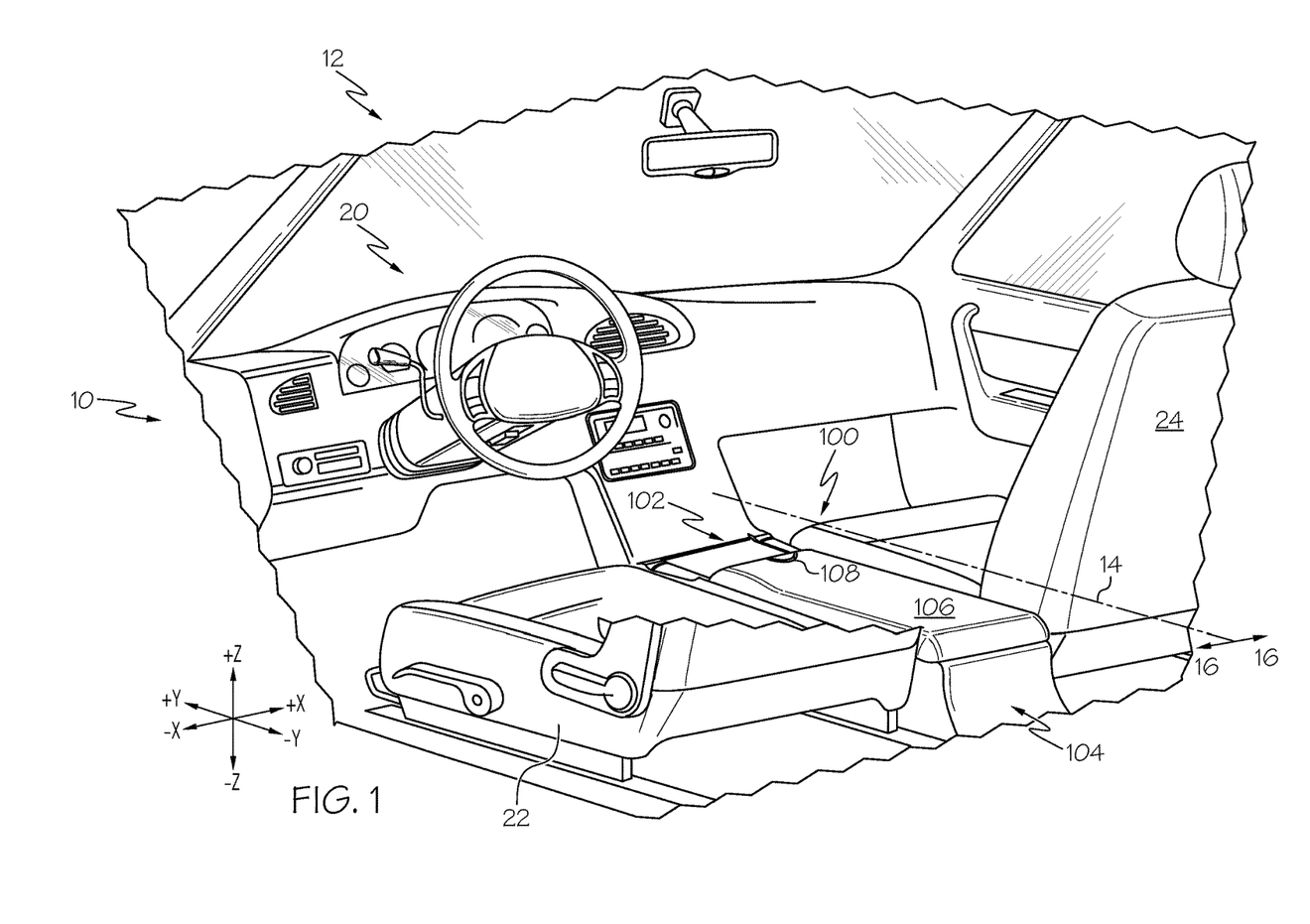
FIG. 1 schematically depicts a partial perspective view of a passenger compartment for a vehicle having a console assembly having a pivotable lid assembly and a storage compartment with the lid assembly in a closed position, according to one or more embodiments described and illustrated herein.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). As used herein, "upper" and "above" are defined as the positive Z direction of the coordinate axis shown in the drawings. "Lower" and "below" are defined as the negative Z direction of the coordinate axis shown in the drawings.

The terms "outboard" or "outward" as used herein refers to the relative location of a component in direction 16 with respect to a vehicle centerline 14. The term "inboard" or "inward" as used herein refers to the relative location of a component in the direction opposite of "inboard" or "inward." Because the vehicle structures may be generally symmetrical about the vehicle centerline 14, the direction to which use of terms "inboard," "inward," "outboard" and "outward" refer may be mirrored about the vehicle centerline 14 when evaluating components positioned along opposite sides of the vehicle 10.

Referring initially to FIG. 1, a partial perspective view of a passenger compartment 12 of a vehicle 10 is depicted. The passenger compartment 12 includes a driver area and a passenger area. An instrument panel 20 is provided within the passenger compartment 12. The instrument panel 20 generally extends in the vehicle lateral direction and includes, without limitation, an instrument cluster, a radio, and a climate control cluster including a plurality of individual vents. Further, the passenger compartment 12 includes a driver seat 22 and a front passenger seat 24. Located adjacent the driver seat 22 are the controls to the vehicle 10 such as, without limitation, a steering wheel, a gas pedal, and a brake pedal. It should be appreciated that the passenger compartment 12 may include a plurality of passenger seats rearward of the front passenger seat 24 in a vehicle longitudinal direction.

Generally, between the driver seat 22 and the front passenger seat 24 is a console assembly 100. The console assembly 100 generally extends in the vehicle longitudinal direction extending from the instrument panel 20 ending at or slightly beyond a rear surface of the driver seat 22 and the front passenger seat 24. Further, the console assembly 100 generally extends in the vehicle lateral direction an equal distance outwardly from the vehicle centerline 14, limited in width by the distance between the driver seat 22 and the front passenger seat 24. The console assembly 100 includes a forward portion 102 and a rearward portion 104, the forward portion 102 being closer to the instrument panel 20 than the rearward portion 104. In some embodiments, the forward portion 102 comprises cup holders, change holders, sliding trays, or other compartments for holding material. Disposed within the rearward portion 104 of some embodiments of the console assembly 100 is a lid assembly 106 and a button 108.

Figure 2:
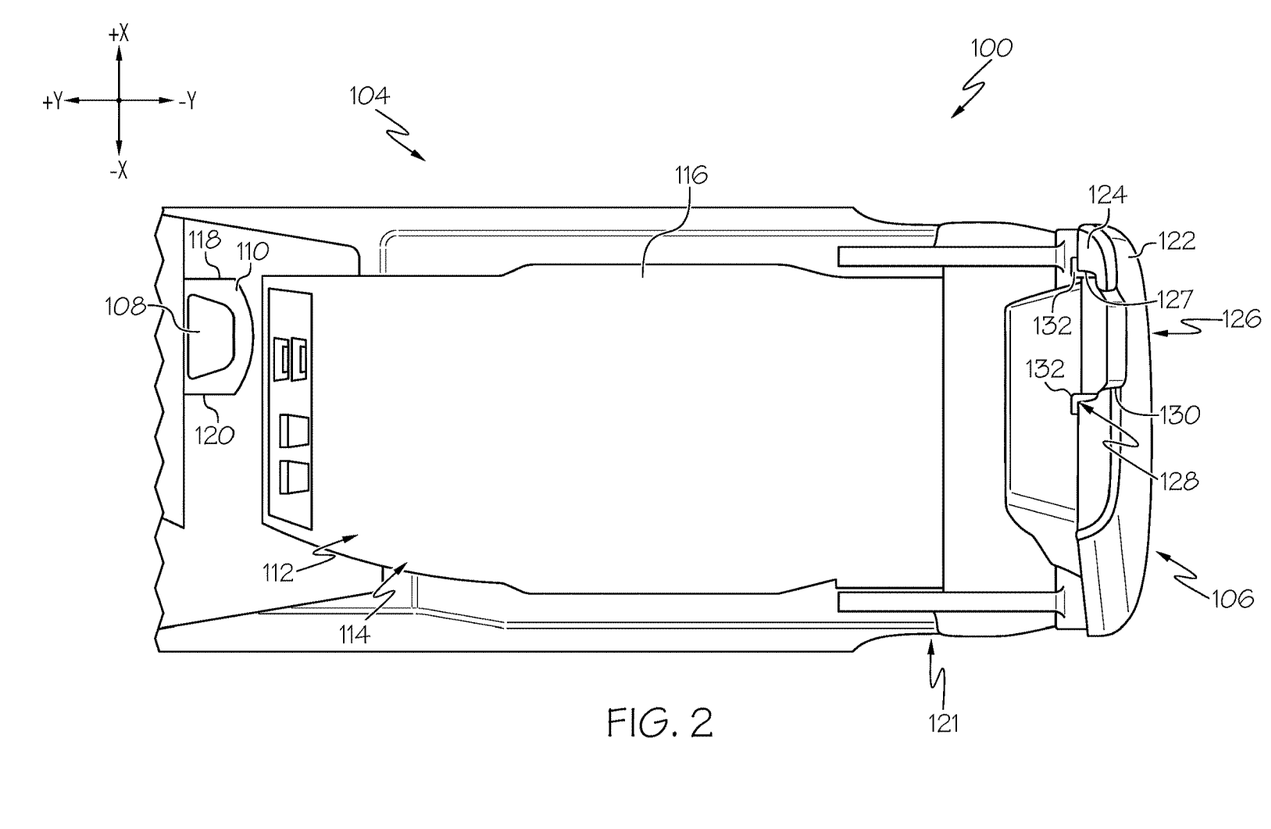
FIG. 2 schematically depicts a top view of the console assembly of FIG. 1 with the pivotable lid assembly in an open position, according to one or more embodiments described and illustrated herein.

Referring to FIG. 2, a storage compartment 112 may be integrated with the console assembly 100 and may comprise a console housing 114. The storage compartment may comprise one or more storage trays, such as a sliding tray, or other implementations for organizing items within the storage compartment 112. In some embodiments, the storage compartment 112 is integrated with the console assembly 100 and the instrument panel 20. In some other embodiments, the storage compartment 112 may be separated from the console assembly 100, the instrument panel 20, or both.

The button 108 or other suitable device may be configured to allow access to the storage compartment 112 of the console assembly 100. For example, the button 108 may be configured with a snap fit connection that, when pushed, unlatches the lid assembly 106 and allows the lid assembly 106 to be opened. In some embodiments, the button 108 is biased, such as, for example, by a spring such that the top surface of the button is accessible to the touch of a user and pressure actuated, such that when a user presses the button, access is granted to the storage compartment 112. However, it is contemplated that embodiments may include any type of device that allows a user to selectively access the storage compartment 112.

A console housing portion 110 may surround the button 108 and comprise a pair of console housing portion sidewalls 118, 120. The console housing portion sidewalls 118, 120 may interface with the lid assembly 106 as will be described in greater detail herein, for example, the console housing portion 110 may contact portions of the lid assembly 106 when the lid assembly 106 is in a closed position.

The lid assembly 106 may be hingedly connected to the console housing 114 at hinged connection 121. The hinged connection 121 may permit a user of the vehicle to selectively open and close the lid assembly 106 by swinging the lid assembly 106 up or down about the hinged connection 121. While the particular embodiment shown utilizes a hinged connection at the rearward end of the console assembly 100, other methods of joining the lid assembly 106 and the body of the console assembly 100 that allow access to the storage compartment 112 are contemplated, such as, for example, a hinged connection on either lateral edge (i.e., right or left edge) of the center console, or for example, a sliding connection, wherein a lid assembly of the console assembly 100 slides rearward or forward allowing access to the storage compartment 112. As illustrated in FIG. 2, the lid assembly 106 is in an open position, permitting access to the storage compartment 112.

Figure 3:
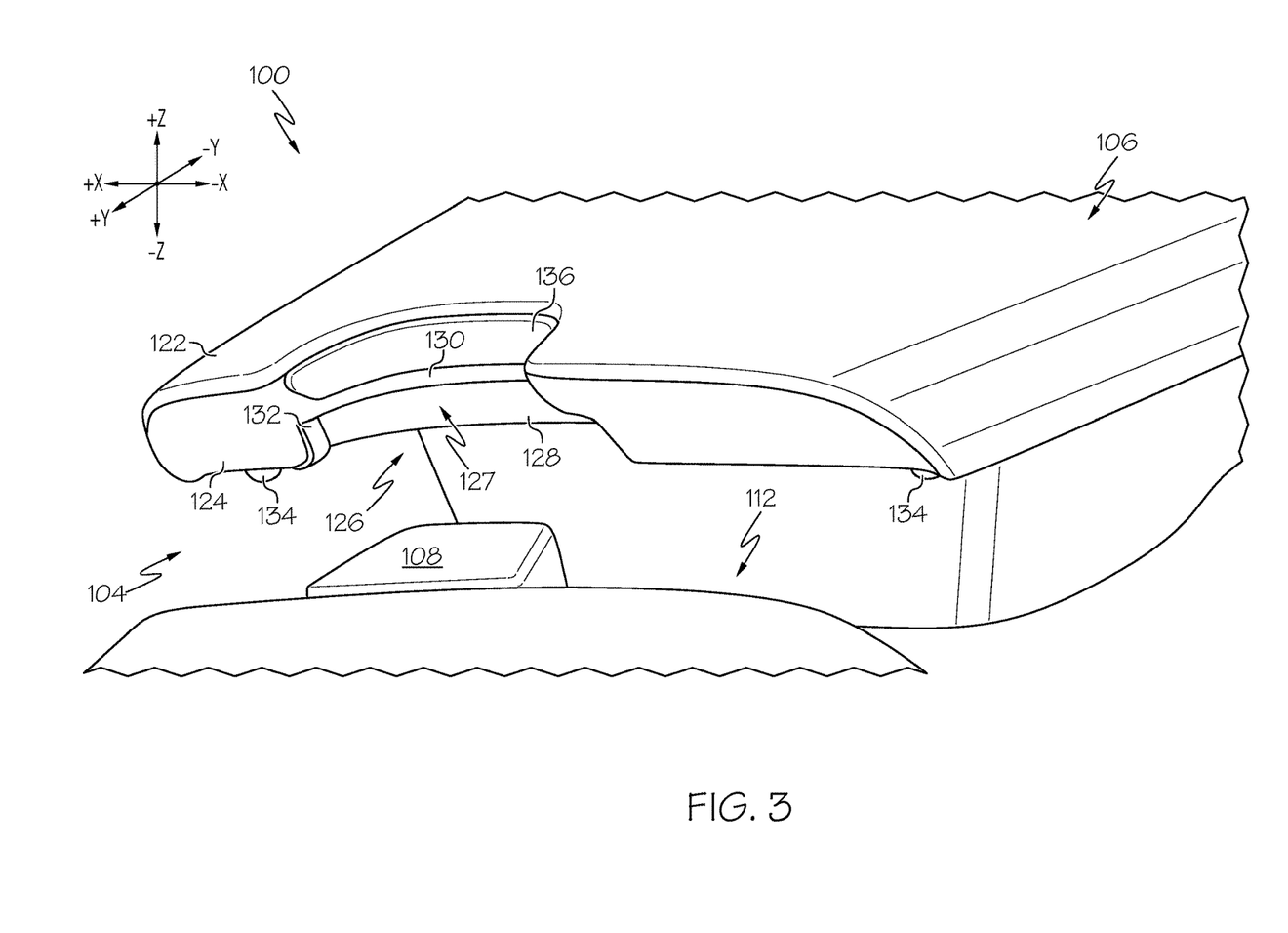
FIG. 3 schematically depicts a perspective view of the lid assembly of the console assembly of FIG. 1 in a partially open position, according to one or more embodiments described and illustrated herein.
Figure 4:
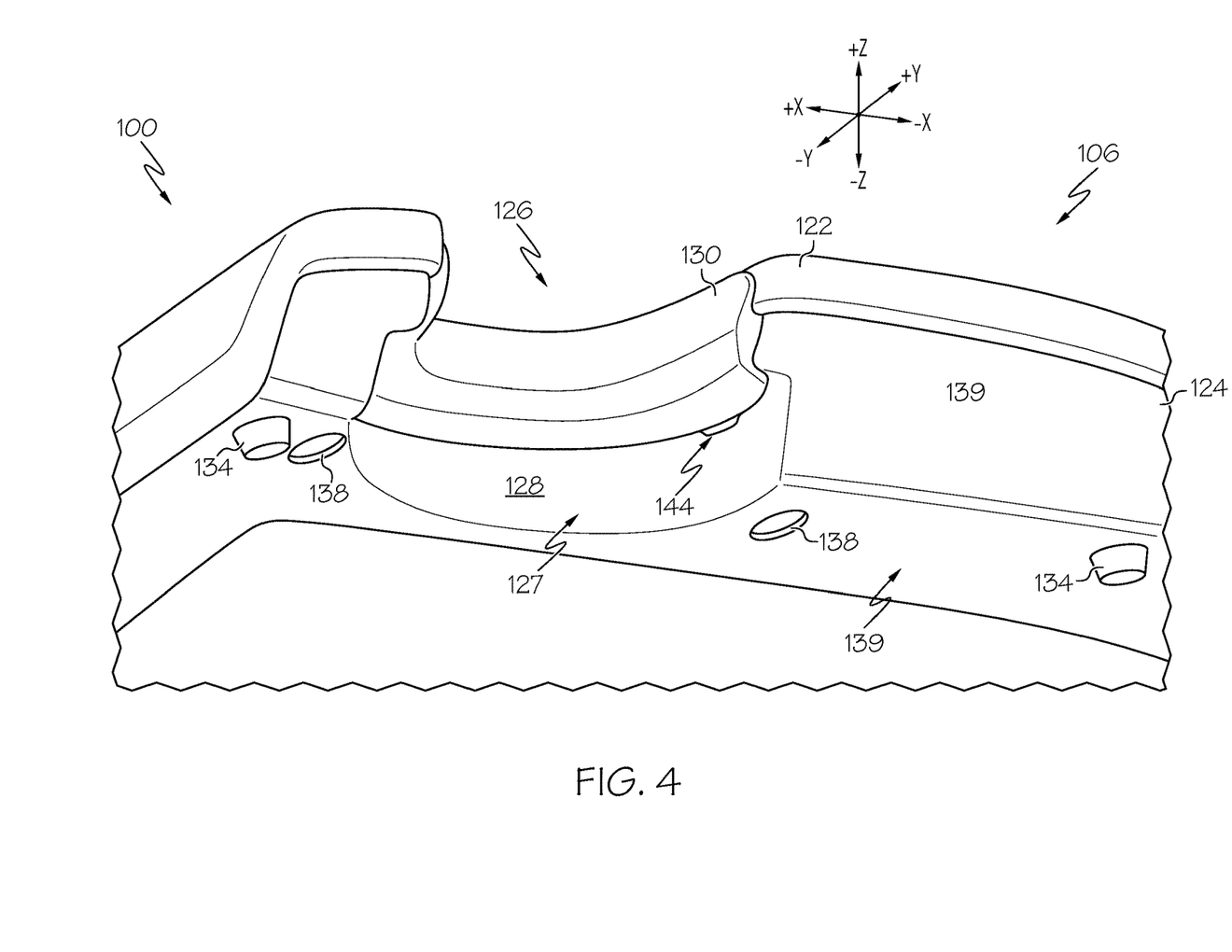
FIG. 4 schematically depicts a perspective view of the bottom of the lid assembly of the console assembly of FIG. 1 in a partially open position, according to one or more embodiments described and illustrated herein.

As can be seen in FIGS. 2, 3, and 4, the lid assembly 106 may be formed from distinct pieces such as, for example, a lid cover component 122 and a lid base component 124. The lid cover component 122 and the lid base component 124 may include a lid opening recess 126 and embodiments of the lid opening recess 126 may be formed by a lower wall portion 128 and an upper wall portion 130. Portions of one or more buffer strips 132 may surround or partially surround portions of the lower wall portion 128 as will be described in greater detail herein. One or more buffer strips 132 may be wrapped around portions of the lower wall portion 128 and in between the lid cover component 122 and the lid base component 124.

As shown in FIGS. 2 and 3, the one or more buffer strips 132 may be flexible, resilient, conformable strips. For example, and not by way of limitation, the buffer strips 132 may be formed from rubber, foam, plastic, or felt, or some combination thereof. In some embodiments, the buffer strips 132 may be a composite of several materials. For example, and not by way of limitation, the buffer strips 132 may include a rubber strip having a foam surface. As another non-limiting example, the buffer strips 132 may be felt tape having a felt side and an adhesive side. The buffer strip 132 may be of sufficient length to surround portions of the lid assembly 106, including, for example, portions of the lower wall portion 128.

In some embodiments, when the lid assembly 106 is in a closed position, the lid opening recess 126 surrounds the button 108 and the console housing portion 110. For example, the lower wall portion 128 may at least partially surround the console housing portion 110, and the upper wall portion 130 may at least partially surround the button 108. Additionally, portions of the lid opening recess 126 may be in contact with the button 108 and/or portions of the console assembly 100 such as, for example, console housing portion 110. For example, the lower wall portion 128 may be in contact with portions of the console assembly 100 such as the console housing portion sidewalls 118, 120. In embodiments, the contact between the lower wall portion 128 and the console housing portion sidewalls 118, 120, is buffered by the buffer strip 132. Hence, the buffer strip 132 may reduce or eliminate vibration, rattling, or noise between the lid assembly 106 and the console housing 114 of the console assembly 100.

To avoid the edges or corners of a buffer, such as buffer strip 132, from peeling away from the surfaces to which they adhere, embodiments of the present disclosure include one or more buffer strips 132 that loop around portions of the lid assembly 106, such as, for example, the lower wall portion 128 to anchor the buffer strip 132 in place. Specific embodiments of this "anchoring" will be described in greater detail below.

FIG. 3 shows a zoomed in view of the front of the rearward portion 104 of the console assembly 100. For context, the lid assembly 106 is shown in a partially open position, leaving the storage compartment 112 slightly open. Additionally, the button 108 is shown. As described above, the lid assembly 106 includes the lid cover component 122, the lid base component 124, the lid opening recess 126 having the lower wall portion 128 and the upper wall portion 130.

Some embodiments of the lid assembly 106 may further include rubber pads 134 for contacting the console housing 114 of the console assembly 100 when the lid assembly 106 is in the closed position. Additionally, some embodiments of the lid assembly 106 may include one or more garnishments, such as, for example, chrome garnish 136 disposed along portions of the lid assembly 106 such as, for example, the upper wall portion 130.

Referring now to both FIGS. 2 and 3, the one or more buffer strips 132 extend beneath and/or partially cover the lower wall portion 128. A portion of the buffer strip 132 is shown in FIG. 3 looping around the lower wall portion 128. The buffer strip 132 may be a felt tape with an adhesive backing. In some embodiments of the console assembly 100, the adhesive backing is in contact with portions of the lid assembly 106, such as lower wall portion 128, and a buffering side thus contacts one or more portions of the console housing 114 such as, for example, the console housing portion sidewalls 118, 120 when the lid cover component 122 of the lid assembly 106 is lowered into the closed position. The looping of the buffer strip 132 will be described in greater detail below.

Now referring to FIGS. 4 and 5, additional aspects of the console assembly 100 will be described. FIG. 4 shows the lid assembly 106 in an open or partially open configuration from beneath the lid assembly 106. The lid cover component 122, lid base component 124, lid opening recess 126, lower wall portion 128, upper wall portion 130, and rubber pads 134 are shown. FIG. 4 shows the lid assembly 106 with the one or more buffer strips 132 removed to clearly illustrate the passage openings 138.

The passage openings 138 provide an opening for the buffer strips 132 to pass through from an underhang surface 139 of the lid base component 124 into the space in the lid assembly 106 between the lid cover component 122 and the lid base component 124, thus allowing the buffer strips 132 to fully loop around the lower wall portion 128. The buffer strips 132 are stretched along an external surface 127 of the lower wall portion 128 around the underhang surface 139 of the lid base component 124 and up, into the passage opening 138.

Figure 5:
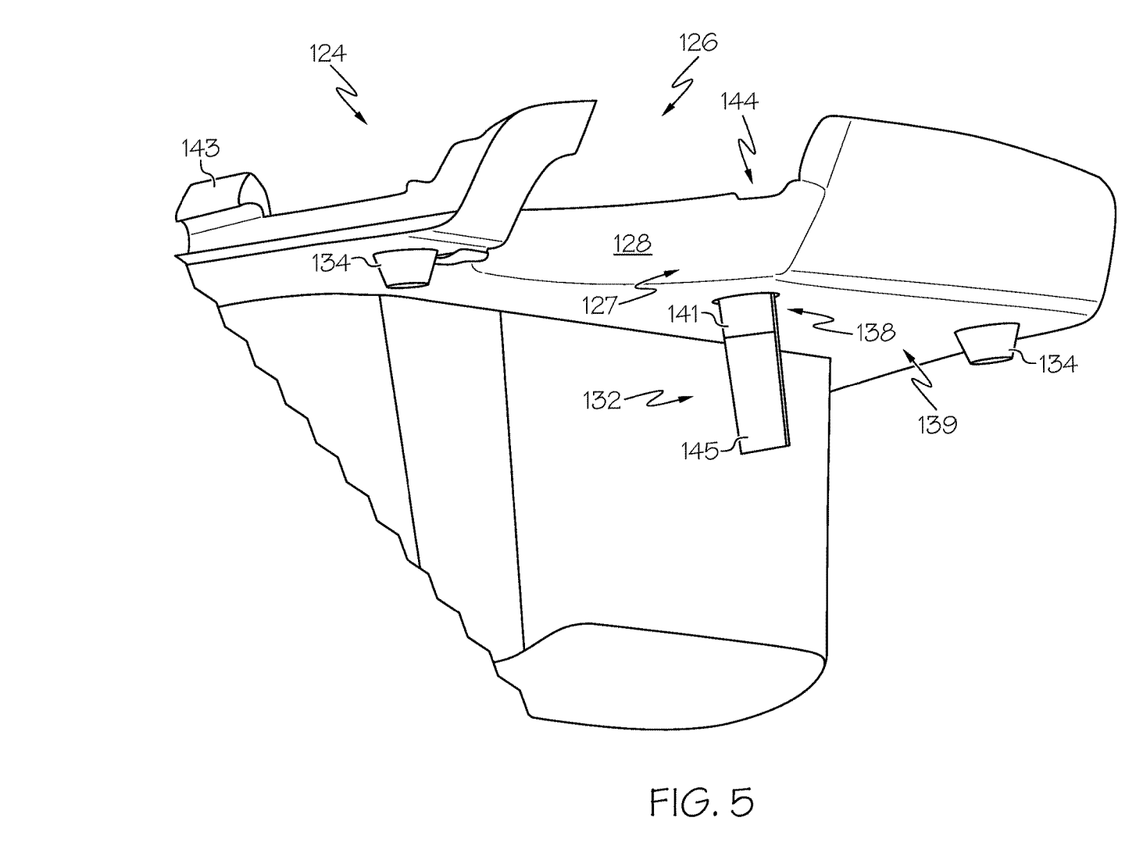
FIG. 5 schematically depicts a perspective view of a lid base component of a lid assembly of the console assembly of FIG. 1, according to one or more embodiments described and illustrated herein.

FIG. 5 illustrates the lid base component 124 separate from the lid cover component 122. Some embodiments of the lid base component 124 may include one or more devices, such as, for example a clip, for connecting the lid base component 124 to the lid cover component 122. It is contemplated that other devices or implementations may be used to connect the lid base component 124 and the lid cover component 122, such as, for example, adhesive or epoxy.

Still referring to FIG. 5, a portion of the buffer strip 132 is shown passing through the passage opening 138. An adhesive section 145 is shown at the end of the buffer strip 132 where a removable cover portion is removed. As illustrated, the buffer strip 132 may pass through the passage opening 138, before being looped around the lower wall portion 128 and over an indent 144 to loop back around the lower wall portion 128. The buffer strip 132 in FIG. 5 includes a removable cover portion 141 that may be installed to selectively prevent an adhesive portion, such as the adhesive section 145, of the buffer strip 132 from adhering to surfaces of the lid base component 124 until the removable cover portion 141 is removed.

Figure 6:
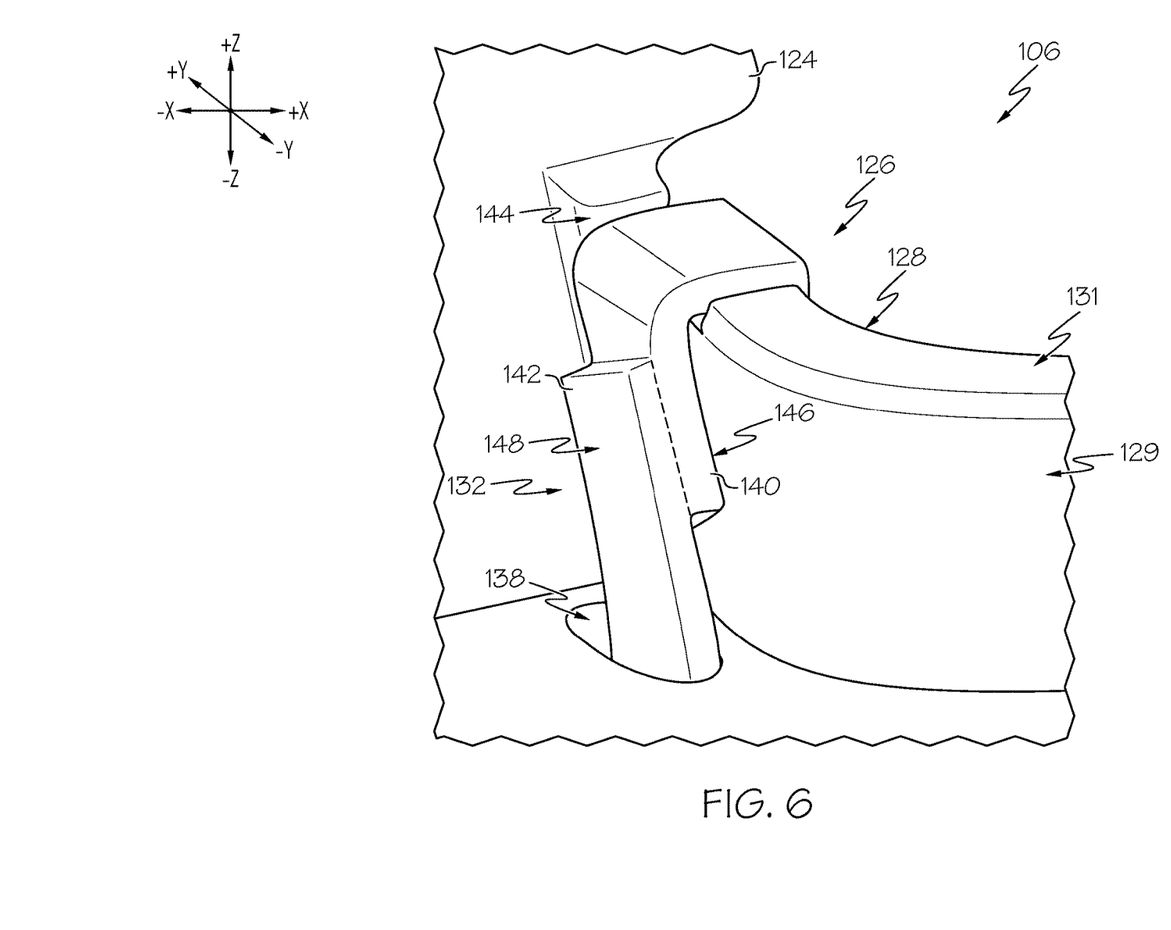
FIG. 6 schematically depicts a view of the internal structure of the lid assembly of the console assembly of FIG. 1, according to one or more embodiments described and illustrated herein.

Referring now to FIG. 6, an overlapping segment of the buffer strip 132 is shown. A second end portion 142 of the buffer strip 132 is depicted overlapping a first end portion 140 within the lid base component 124 of the lid assembly 106. The lid base component 124 is shown looking forward in the longitudinal direction, from inside the body of the lid assembly 106 with the lid cover component 122 removed as discussed above. Portions of an interior surface 129 of the lower wall portion 128 and the lid opening recess 126 are shown for reference.

In the illustrated embodiment of the lid assembly 106, an adhesive side 146 of the buffer strip 132 is pressed against the interior surface 129 of the lower wall portion 128 and looped up, then over the indent 144, then around the lower wall portion 128 (as shown in FIG. 3) such that it adheres to the external surface 127 (FIGS. 3, 4, 5) of the lower wall portion 128. The buffer strip 132 is then looped under the underhang surface 139 (FIGS. 4, 5) of the lid base component 124. The buffer strip 132 passes along the underhang surface 139 of the lid base component 124 then back up through the passage opening 138.

The indent 144 in an upper edge 131 of the lower wall portion 128 provides clearance between the upper edge 131 of lower wall portion 128 and the lid cover component 122 for the buffer strip 132 to pass. In some embodiments, the indent 144 may be dimensioned proportionately for the width of the buffer strip 132, or vice-a-versa. As one example, and not by way of limitation, embodiments of the console assembly 100 using a 1 mm thick buffer strip 132 may include an indent that is at least 1 mm in depth. However, because the buffer strip 132 is compressible, some embodiments of the console assembly 100 may include an indent having a width dimension that is less than or equal to the width of the buffer strip 132. This may create friction between the buffer strip 132 and the surfaces of the lower wall portion 128 at the indent 144, thereby increasing the anchoring effect on the buffer strip 132.

In some embodiments of the console assembly 100, the buffer strip 132 overlaps itself as it loops around the portion of the lower wall portion 128 in the lid base component 124. FIG. 6 shows the second end portion 142 of the loop of the buffer strip 132 overlapping the first end portion 140. However, embodiments are contemplated in which the buffer strip does not include an overlapping portion such as, for example, embodiments in which the opposite ends of the buffer strip 132 merely touch at the tips or embodiments in which the first end portion 140 and the second end portion 142 both directly adhere to the lower wall portion 128 and do not touch. In some embodiments, the second end portion 142 may be directly adhered to the lower wall portion 128 and the first end portion 140 may overlap the second end portion 142.

As shown in FIG. 6, some embodiments of the buffer strip 132 may include the adhesive side 146 and an external-contact side 148. In some embodiments, the adhesive side 146 may be covered in an adhesive substance, such as, for example, glue, epoxy, or any other adhesive substance now known or later developed that covers substantially the entire length of the buffer strip 132. However, in some embodiments, the adhesive substance may cover merely a portion or portions of the buffer strip.

Additionally, in some embodiments, the adhesive side 146 may be covered with the removable cover portion 141 that may be removed prior to installing the buffer strip 132 or portions of the buffer strip 132. Further, in some embodiments, the removable cover portion 141 may be partially removable, such as, for example, embodiments in which the removable cover portion 141 is split in to two sections, each covering one half of the adhesive side 146 of the buffer strip 132, or wherein the removable cover is split into four sections, each covering a quarter-portion or less of the adhesive side 146 of the buffer strip 132.

The removable cover portion 141 may be useful in installing the buffer strip 132. For example, as shown in FIG. 5, a portion of the removable cover portion 141 may be removed, such as the portion removed to expose adhesive section 145. Adhesive section 145 may then be looped under the underhang surface 139 of the lid base component around the external surface 127 of the lower wall portion 128 and over the indent 144 to form a loop around the lower wall portion 128.

Subsequent sections of the removable cover portion 141 may then be selectively removed to adhere the remaining portions of the buffer strip to the lower wall portion 128. In this way, the adhesive side 146 can be selectively installed within the lid assembly 106 to provide a buffer, such as the buffer shown in FIG. 7.

Figure 7:
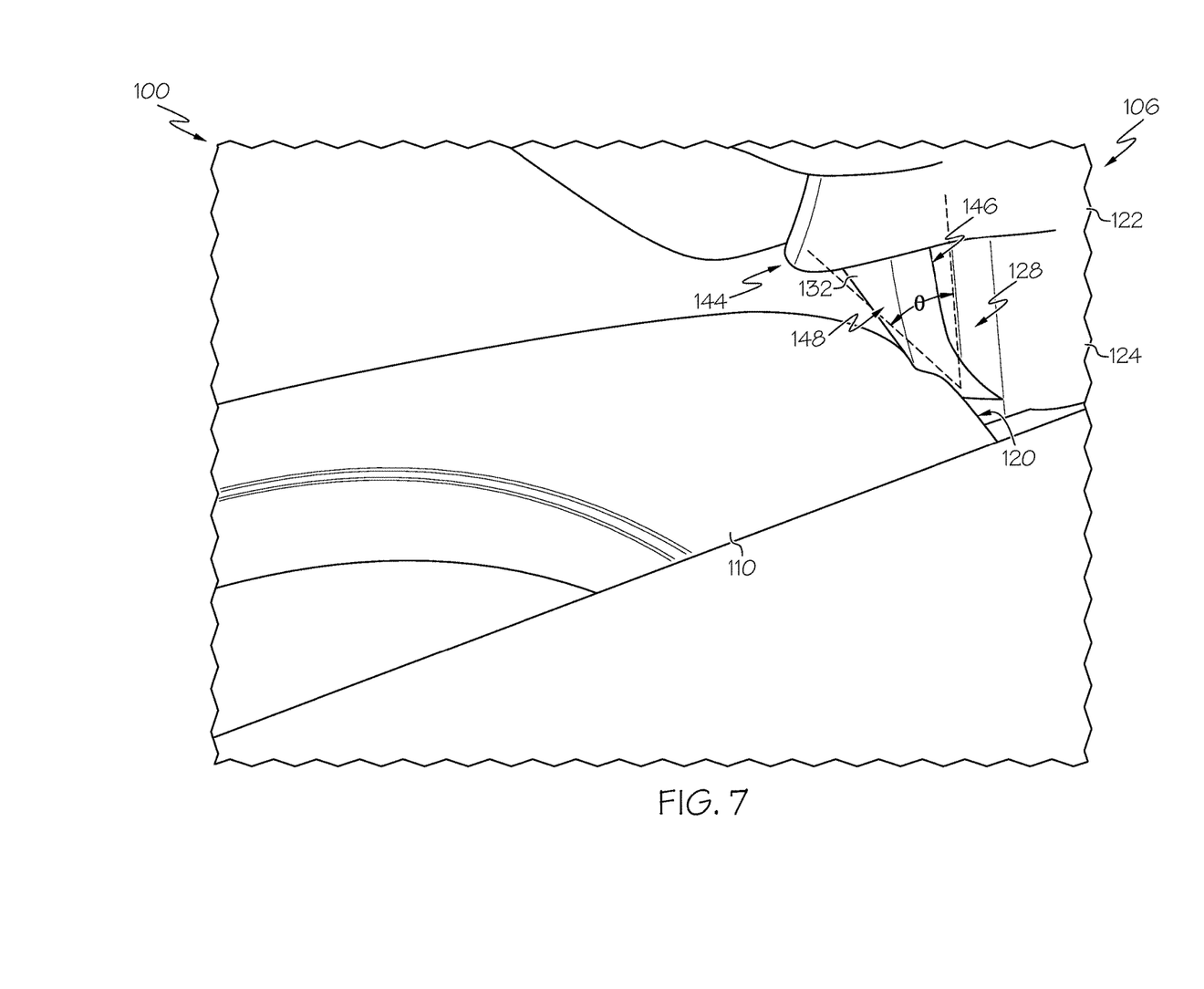
FIG. 7 schematically depicts a front view of a mechanical interface between the lid assembly and housing of the console assembly of FIG. 1, according to one or more embodiments described and illustrated herein.

FIG. 7 shows a zoomed-in view of the lid assembly 106 in a nearly-closed position with the buffer strip 132 buffering contact between the lid assembly 106 and the console housing portion 110. As shown, the lower wall portion 128 and the console housing portion sidewall 120 are interfacing, buffered by the buffer strip 132. The angle between the plane created by the outward facing portion of the console housing portion sidewall 120 and the plane created by the external surface 127 (FIGS. 3, 4, 5) of the lower wall portion 128 at the point of interface will be referred to as the interface angle $\theta$ herein. Generally, as the magnitude of the interface angle $\theta$ decreases (toward 0 degrees), the magnitude of the shear force that acts to peel the buffer strip 132 from the lower wall portion 128 increases. As one non-limiting example, in some embodiments of the console assembly 100, the interface angle $\theta$ is less than forty-five degrees. As another non-limiting example, the interface angle $\theta$ may be between 0 and 10 degrees.

As shown, the interface angle $\theta$ may be near zero (i.e., the external surface 127 of the lower wall portion 128 is nearly parallel to the console housing portion sidewall.) Hence, the magnitude of the shear force pulling the buffer strip 132 from the surface of the lower wall portion 128 will be relatively large. This shear force is generated in the buffer strip 132 as the buffer strip 132 slides along the console housing portion sidewall 120 when the lid assembly 106 is pivoted from the open position to the closed position and from the fully closed position to the open position. This shear force may tend to pull at the buffer strip 132.

To inhibit peeling, exposed edges of the buffer strip 132 may be oriented such that they do not make direct contact with the console housing portion sidewall 120 or are moved away from the console housing portion sidewall 120. As shown in FIG. 7, the buffer strip 132 is arranged such that it is looped around the lower wall portion 128 and overlaps itself as shown in FIG. 6, thus making the peeling of the buffer strip 132 less likely. Thus, no edges of the buffer strip 132 contact the console housing portion sidewall 120.

The structures described herein can increase the adhesion force of the buffer strip 132 to the lid assembly 106 in at least two ways. First, in embodiments of the buffer strip 132 that have an adhesive backing, providing a passage opening 138 that allows the buffer strip 132 to reach surfaces that the buffer strip 132 would not otherwise be able to contact thereby increasing the available surface area of adhesion between the buffer strip 132 and the lid assembly 106. This can increase the overall adhesive force between the buffer strip 132 and the lid assembly 106. Second, in embodiments of the buffer strip 132 in which the buffer strip 132 is looped around a portion or portions of the housing of the lid assembly 106, the buffer strip 132 may actually be looped around itself, anchoring the buffer strip 132 to the portion of the lid assembly 106.

It is noted that the terms "substantially" and/or "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An automobile console assembly comprising:
   a center console housing;
   a lid assembly that mechanically interfaces with the console housing, the lid assembly including a passage opening that extends through a base component of the lid assembly and being moveable relative to the console housing between an open configuration and a closed configuration; and
   an adhesive buffer strip that passes through the passage opening and between the console housing and the lid assembly with the lid assembly in the closed configuration.

2. The console assembly of claim 1, wherein the buffer strip extends over a lower wall portion of the base component that faces a console portion housing sidewall with the lid assembly in the closed configuration.

3. The console assembly of claim 2, wherein the lid assembly further comprises an underhang surface, a cover component and an indent between the base component and the cover component such that the buffer strip passes through the passage opening, along the underhang surface, over the wall of the base component, then over the indent between the base component and the cover component.

4. The console assembly of claim 3, wherein:
   the buffer strip comprises an adhesive side and an external-contact side and a first end and a second end, and
   the adhesive side of the buffer strip contacts the lid assembly and at least a portion of the external-contact side of the buffer strip contacts the console portion housing sidewall with the lid assembly in the closed configuration.

5. The console assembly of claim 4, wherein the first end of the buffer strip comprises a direct-contact end making direct contact with the lid assembly and the second end of the buffer strip comprises an overlapping end, such that the buffer strip loops around the base component of the lid assembly and the overlapping end overlaps the direct-contact end of the buffer strip.

6. The console assembly of claim 4, wherein the external-contact side of the buffer strip comprises felt, rubber, foam, or combinations thereof.

7. The console assembly of claim 1, wherein:
   the console assembly further comprises a console housing portion including a console housing portion sidewall;
   the lid assembly further comprises a lid opening recess comprising a perimeter defined by a lower wall portion; and
   an interface angle between the console housing portion sidewall and the lower wall portion is between zero degrees and forty-five degrees.

8. The console assembly of claim 1, wherein:
   the console assembly further comprises a console housing portion including a console housing portion sidewall;
   the lid assembly further comprises a lid opening recess comprising a perimeter defined by a lower wall portion; and
   an interface angle between the console housing portion sidewall and the lower wall portion is between zero degrees and ten degrees.

9. The console assembly of claim 1, wherein the thickness of the buffer strip is between 0.5 mm and 1.5 mm.

10. A vehicle having a console assembly comprising:
    a center console housing;
    a lid assembly that mechanically interfaces with the console housing, the lid assembly including a passage opening that extends through a base component of the lid assembly and being moveable relative to the console housing between an open configuration and a closed configuration; and
    an adhesive buffer strip that passes through the passage opening and between the console housing and the lid assembly with the lid assembly in the closed configuration.

11. The vehicle of claim 10, wherein the buffer strip extends through the passage opening and over a lower wall portion of the base component that faces a console housing portion sidewall of the console assembly with the lid assembly in the closed configuration.

12. The vehicle of claim 11, wherein the lid assembly further comprises an underhang surface, a cover component and an indent between the base component and the cover component such that the buffer strip passes through the passage opening, along the underhang surface, over the console housing portion sidewall of the base component, then over the indent between the base component and the cover component.

13. The vehicle of claim 12, wherein:
    the buffer strip comprises an adhesive side and an external-contact side and a first end and a second end, and
    the adhesive side of the buffer strip contacts the lid assembly and at least a portion of the external-contact side of the buffer strip contacts the console housing portion sidewall of the console housing with the lid assembly in the closed configuration.

14. The vehicle of claim 13, wherein the first end of the buffer strip comprises a direct-contact end making direct contact with the lid assembly and the second end of the buffer strip comprises an overlapping end, such that the buffer strip loops around the base component of the lid assembly and the overlapping end overlaps the direct-contact end of the buffer strip.

15. The vehicle of claim 13, wherein the external-contact side of the buffer strip comprises felt, rubber, foam, or combinations thereof.

16. The vehicle of claim 10, wherein:
    the console assembly further comprises a console housing portion including a console housing portion sidewall;
    the lid assembly further comprises a lid opening recess comprising a perimeter defined by a lower wall portion; and an interface angle between the console housing portion sidewall and the lower wall portion is between zero degrees and forty-five degrees.

17. The vehicle of claim 10, wherein:
the console assembly further comprises a console housing portion including a console housing portion sidewall;
the lid assembly further comprises a lid opening recess comprising a perimeter defined by a lower wall portion; and
an interface angle between the console housing portion sidewall and the lower wall portion is between zero degrees and ten degrees.

18. The vehicle of claim 10, wherein the thickness of the buffer strip is between 0.5mm and 1.5 mm.

19. A method of preventing an adhesive buffer strip that forms a mechanical interface between a lid assembly and a console housing from peeling away from a base component of the lid assembly comprising:

providing an adhesive buffer strip comprising an adhesive side and an external-contact side and a first end and a second end, the buffer strip having a sufficient length to loop around a portion of the base component of the lid assembly;
looping the buffer strip around the portion of the base component such that the adhesive side contacts and adheres to the portion of the base component, thereby anchoring the buffer strip to the base component.

20. The method of claim 19, wherein:
the first end of the buffer strip comprises a direct-contact end making direct contact with the base component of the lid assembly; and
the second end of the buffer strip comprises an overlapping end overlapping a portion of the direct-contact end such that the buffer strip forms a loop anchored to the base component and to itself.

* * * * *